(12) United States Patent
Lee et al.

(10) Patent No.: US 11,156,468 B2
(45) Date of Patent: Oct. 26, 2021

(54) DEVICE, METHOD, COMPUTER PROGRAM, AND COMPUTER-READABLE RECORDING MEDIUM FOR ROUTE GUIDANCE

(71) Applicant: THINKWARE CORPORATION, Seongnam-si (KR)

(72) Inventors: Ki Wook Lee, Seongnam-si (KR); Hye Kyung Byun, Seongnam-si (KR); Tae Kyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 220 days.

(21) Appl. No.: 16/464,062

(22) PCT Filed: Nov. 22, 2017

(86) PCT No.: PCT/KR2017/013379
§ 371 (c)(1),
(2) Date: May 24, 2019

(87) PCT Pub. No.: WO2018/097609
PCT Pub. Date: May 31, 2018

(65) Prior Publication Data
US 2019/0383629 A1    Dec. 19, 2019

(30) Foreign Application Priority Data

Nov. 26, 2016 (KR) .................. 10-2016-0158829
Nov. 3, 2017 (KR) .................. 10-2017-0146278

(51) Int. Cl.
*G01C 21/34* (2006.01)
*G01C 21/36* (2006.01)
(Continued)

(52) U.S. Cl.
CPC ......... *G01C 21/3492* (2013.01); *G01C 21/36* (2013.01); *G08G 1/0968* (2013.01)

(58) Field of Classification Search
USPC ...................................... 701/423
See application file for complete search history.

(56) References Cited

U.S. PATENT DOCUMENTS

| 8,712,624 | B1* | 4/2014 | Ferguson | G05D 1/0088 |
| | | | | 701/25 |
| 2015/0316386 | A1* | 11/2015 | Delp | G01C 21/3658 |
| | | | | 701/532 |
| 2016/0091897 | A1* | 3/2016 | Nilsson | B60W 30/16 |
| | | | | 701/25 |

FOREIGN PATENT DOCUMENTS

| DE | 11 2015 000783 T5 | 11/2016 |
| JP | 2009-47491 A | 3/2009 |

(Continued)

OTHER PUBLICATIONS

Extended Search Report dated May 18, 2020, issued in counterpart EP Application No. 17872952.1 (12 pages).

(Continued)

*Primary Examiner* — Tyler D Paige
(74) *Attorney, Agent, or Firm* — Westerman, Hattori, Daniels & Adrian, LLP

(57) ABSTRACT

Disclosed herein is a route guidance method. The route guidance method includes calculating a driving route from a current location of a moving body to a destination, determining whether an intersection or a forked road exists at a predetermined distance from the current location of the moving body on the calculated driving route, checking, when the intersection or the forked road exists, link information corresponding to a lane in which the moving body is located and determining a moving direction toward the intersection or the forked road, determining an entry route for entering the intersection or the forked road according to (Continued)

the determined moving direction, and transmitting the determined entry route to the moving body.

20 Claims, 8 Drawing Sheets

(51) Int. Cl.
*G08G 1/0968* (2006.01)
*G08G 1/0962* (2006.01)
*B60W 50/14* (2020.01)
*B60W 50/00* (2006.01)

(56) References Cited

FOREIGN PATENT DOCUMENTS

| JP | 2011-106929 A | 6/2011 |
| JP | 2014-89131 A | 5/2014 |
| KR | 10-2015-0054022 A | 5/2015 |
| KR | 10-2015-0114083 A | 10/2015 |
| WO | 2016/063383 A1 | 4/2016 |

OTHER PUBLICATIONS

Written Opinion of the International Searching Authority dated Mar. 26, 2018 issued in counterpart Application No. PCT/KR2017/013379, with English translation (28 pages).

International Search Report dated Mar. 26, 2018, issued in Application No. PCT/KR2017/013379, with English translation (5 pages).

* cited by examiner

DEVICE, METHOD, COMPUTER PROGRAM, AND COMPUTER-READABLE RECORDING MEDIUM FOR ROUTE GUIDANCE

TECHNICAL FIELD

The present invention relates to a device, a method, a computer program, and a computer-readable recording medium for route guidance, and more particularly, to a device, a method, and a computer program, and a computer-readable recording medium for route guidance capable of performing lane change guidance in consideration of a congested lane section.

BACKGROUND ART

Navigation devices have widely been used for route guidance of vehicles. A navigation device guides a vehicle along a route to a destination according to a driver's input using a global positioning system (GPS) and map data. The driver may use a route guidance service by mounting the navigation device in a vehicle or through a smartphone or a smartpad. The navigation device displays a location of a user according to movement on a map and navigates a moving direction of the user by voice, while on the move.

However, a route guidance service provides route guidance by recognizing a road as one lane. That is, the route guidance service does not guide a route for each lane and does not consider a driving situation of each lane.

Therefore, according to the related art route guidance service, the driver must directly determine a driving situation and select a lane in which to drive the vehicle in an inconvenient manner.

Further, according to the related art route guidance service, it is difficult for the driver to accurately know a congested section of the road. Therefore, in a situation where a lane must be changed for a left (or right) turn during driving, if a left (or right) turn section located in front of the vehicle is congested, it is difficult to make a lane change, so that the driver may go straight to deviate from the route on which he wants to follow or may cut in in the congested section and violate traffic regulations or cause a traffic accident.

DISCLOSURE

Technical Problem

An object of the present invention is to provide a device, a method, a computer program, and a computer-readable recording medium for performing route guidance in consideration of a congested lane section.

Another object of the present invention is to provide a device, a method, a computer program, and a computer-readable recording medium for performing lane change guidance before a vehicle enters a congested lane section to change directions.

Technical Solution

According to an exemplary embodiment of the present invention, a route guidance device (or a device for route guidance) includes: an input unit receiving a destination from a user; a communication unit transmitting and receiving data; and a controller determining, when the destination is input through the input unit, whether moving bodies are congested in a redirection lane (i.e., a direction change lane) and a lane adjacent to the redirection lane on a road including a plurality of lanes and a plurality of links respectively identified by unique identification information (IDs), while guiding a route, and dividing any one of the plurality of lanes and the plurality of links respectively identified by the IDs included in the redirection lane and the lane adjacent to the redirection lane into predetermined sections to determine whether the moving bodies are congested in each section.

The controller may determine whether a moving body needs to be changed in direction, and cause the moving body which needs to be changed in direction to change lanes before entering a congested section when the moving body needs to be changed in direction.

The controller may divide a length of each of the plurality of lanes respectively identified by the IDs by a time required (taken) for each moving body to pass by each lane to calculate an average speed of each moving body in each lane, add respective average speeds of the moving bodies which have run in any one lane for a predetermined period of time, and divide the sum of the average speeds by a total number of the moving bodies which have run in the corresponding lane to calculate an average speed of the entirety of the moving bodies in the corresponding lane to determine whether the moving bodies are congested.

The controller may divide a length of each of the plurality of links respectively identified by the IDs by a time required for each moving body to pass by each link to calculate an average speed of each moving body in each link, adding respective average speeds of the moving bodies which have run in any one link for a predetermined period of time, and divide the sum of the average speeds by a total number of the moving bodies which have run in the corresponding link to calculate an average speed of the entirety of the moving bodies in the corresponding link to determine whether the moving bodies are congested.

In case of dividing any one of the plurality of lanes and the plurality of links respectively identified by the IDs into the predetermined sections, the controller may divide a length of each section by a time required for each moving body to pass by each section to calculate an average speed of each moving body in each section, add respective average speeds of the moving bodies which have run in any one section for a predetermined period of time, and divide the sum of the average speeds by a total number of the moving bodies which have run in the corresponding section to calculate an average speed of the entirety of the moving bodies in the corresponding section to determine whether the moving bodies are congested.

The controller may transmit lane change information to the route guidance device so that the moving body may change lanes before entering a congested section.

The controller may transmit at least one of the average speed of each moving body and the average speed of the entirety of the moving bodies to the route guidance device.

The communication may receive at least one of location information, operation time information, and route information of the corresponding moving body from the corresponding moving body.

The route guidance device may further include a display unit displaying information for route guidance, wherein the controller may display lane change information.

According to another exemplary embodiment of the present invention, a route guidance method (or a method for route guidance) includes: determining whether moving bodies are congested in a redirection lane and a lane adjacent to the redirection lane on a road including a plurality of lanes and a plurality of links respectively identified by unique identification information (IDs); dividing any one of the plurality of lanes and the plurality of links respectively identified by the IDs included in the redirection lane and the lane adjacent to the redirection lane into predetermined sections; and determining whether the moving bodies are congested in each section.

The route guidance method may further include receiving at least one of location information, operation time information, and route information of the corresponding moving body from the corresponding moving body.

The route guidance method may further include determining whether a corresponding moving body needs to be changed in direction and causing the moving body which needs to be changed in direction to change lanes before entering a congested section.

The changing of lanes may include transmitting lane change information to a route guidance device to make a lane change before the corresponding moving body enters a congested section, and the changing of lanes may include displaying the lane change information.

The determining of whether moving bodies are congested in a redirection lane and a lane adjacent to the redirection lane may include: dividing a length of each of the plurality of lanes respectively identified by the IDs by a time required for each moving body to pass by each lane to calculate an average speed of each moving body in each lane; and adding respective average speeds of the moving bodies which have run in any one lane for a predetermined period of time and dividing the sum of the average speeds by a total number of the moving bodies which have run in the corresponding lane to calculate an average speed of the entirety of the moving bodies in the corresponding lane.

The determining of whether moving bodies are congested in a redirection lane and a lane adjacent to the redirection lane may include: dividing a length of each of the plurality of links respectively identified by the IDs by a time required for each moving body to pass by each link to calculate an average speed of each moving body in each link; and adding respective average speeds of the moving bodies which have run in any one link for a predetermined period of time and dividing the sum of the average speeds by a total number of the moving bodies which have run in the corresponding link to calculate an average speed of the entirety of the moving bodies in the corresponding link.

The determining of whether the moving bodies are congested in each section may include: dividing a length of each section by a time required for each moving body to pass by each section to calculate an average speed of each moving body in each section; and adding respective average speeds of the moving bodies which have run in any one section for a predetermined period of time, dividing the sum of the average speeds by a total number of the moving bodies which have run in the corresponding section to calculate an average speed of the entirety of the moving bodies in the corresponding section.

The route guidance method may further include: transmitting, to the route guidance device, at least one of the average speed of each moving body and the average speed of the entirety of the moving bodies.

According to another exemplary embodiment of the present invention, a route guidance method includes calculating a driving route from a current location of a moving body to a destination; determining whether an intersection or a forked road (or branched road) exists at a predetermined distance from the current location of the moving body on the calculated driving route; checking, if the intersection or the forked road exists, link information corresponding to a lane in which the moving body is located and determining a moving direction toward the intersection or the forked road; determining an entry route for entering the intersection or the forked road according to the determined moving direction; and transmitting the determined entry information to the moving body, wherein the determining of an entry route includes: determining whether a lane for the moving body to run in is to be changed according to the moving direction toward the intersection or the forked road; if the lane for the moving body to run in is to be changed, determining a traffic flow on a redirection lane in which the moving body is to run and a lane adjacent to the redirection lane according to the moving direction; and determining an entry spot of the moving body according to the determined traffic flow.

The determining of a traffic flow may include: when the moving body is to move from the current driving lane to a redirection lane to run to the intersection or the forked road, determining a traffic volume of the redirection lane and an adjacent lane of the redirection lane in a predetermined unit; and determining entry information for changing lanes according to the determined traffic volume.

The determining of a traffic volume in a predetermined unit may include: measuring an average speed of moving bodies moving on a link corresponding to redirection lane and the adjacent lane in the predetermined unit; and determining the traffic volume according to a result of comparing the measured average speed with a predetermined reference speed.

The determining of entry information may include determining an entry spot for entering a section in which the measured average speed is faster than the reference speed.

When the entry information indicates an entry spot for the moving body to enter, the entry information may be determined according to a traffic volume of any one of the redirection lane and the adjacent lane, and when the traffic volume is large, the entry spot may be determined as a spot closer than a predetermined reference position.

When the entry information indicates an entry time for the moving body to enter, the entry information may be determined according to a traffic volume of any one of the redirection lane and the adjacent lane, and when the traffic volume is large, the entry time may be determined as a time earlier than a predetermined reference time.

The redirection lane may be a lane in which a moving direction is indicated by an arrow on the road and include at least one of a left turn lane, a right turn lane, and a go-straight and left turn lane, and the route guidance method may further include displaying the determining moving direction for a user.

The route guidance method may further include generating a control signal for controlling a moving direction of the moving body according to the determined entry route.

The route guidance method may further include receiving destination information from the moving body.

According to another exemplary embodiment of the present invention, a route guidance device includes: a communication unit receiving destination information from a moving body; and a controller calculating a driving route from a current location of the moving body to the destination information, determining whether an intersection or a forked road exists at a predetermined distance from the current location of the moving body on the calculated driving route, checking, if the intersection or the forked road exists, link information corresponding to a lane in which the moving body is located, determining a moving direction toward the intersection or the forked road, determining an entry route for entering the intersection or the forked road according to the determined moving direction, and transmitting the determined entry route to the moving body, wherein the controller determines whether a lane for the moving body to run in is to be changed according to the moving direction toward the intersection or the forked road, and if the land for the moving body to run in is to be changed, the controller determines a traffic flow on a redirection lane in which the moving body is to run and a lane adjacent to the redirection lane according to the moving direction, and determines an entry spot of the moving body according to the determined traffic flow.

According to another exemplary embodiment of the present invention, a route guidance method includes: receiving a driving route from a current location of a moving body to a destination calculated by a server; performing route guidance of the moving body according to the received driving route; and displaying, if an intersection or a forked road exists at a predetermined distance from the current location of the moving body on the calculated driving route, a moving direction toward the intersection or the forked road received from the server, wherein the moving direction includes an entry route for entering the intersection or the forked road from a link corresponding to a lane in which the moving body is located, and if a lane in which the moving body is to run is to be changed for the moving body to move toward the intersection or the forked road, the determined entry route includes an entry spot toward the intersection or the forked road determined according to a traffic flow on a redirection lane in which the moving body is to run and a lane adjacent to the redirection lane according to the moving direction.

The route guidance method may further include outputting a control signal for the moving body to enter the entry spot according to the moving direction.

According to another exemplary embodiment of the present invention, a route guidance device includes: a display unit; a communication unit receiving a driving route from a current location of a moving body to a destination calculated by a server; and a controller performing route guidance of the moving body according to the received driving route and controlling, if an intersection or a forked road exists at a predetermined distance from the current location of the moving body on the calculated driving route, the display unit to display a moving direction toward the intersection or the forked road received from the server, wherein the moving direction includes an entry route for entering the intersection or the forked road from a link corresponding to a lane in which the moving body is located, and if a lane in which the moving body is to run is to be changed for the moving body to move toward the intersection or the forked road, the determined entry route includes an entry spot toward the intersection or the forked road determined according to a traffic flow on a redirection lane in which the moving body is to run and a lane adjacent to the redirection lane according to the moving direction.

According to another exemplary embodiment of the present invention, a method for route guidance of a moving body includes: dividing links respectively corresponding to a plurality of lanes constituting a road into predetermined length units; calculating an average speed of moving bodies in each of the divided link sections; and differentiating between a congested section and a non-congested section in each of the link sections on the basis of the calculated average speed, matching information indicating congestion to each link section, and storing the corresponding information.

The method may further include: allocating identification information (ID) to each of the divided link sections, wherein, in the storing, the information indicating congestion may be matched to the ID and stored.

The method may further include: generating information indicating congestion by day or by time on the basis of the average speed.

The calculating of an average speed may include: dividing a length of each of the plurality of link sections by a time required for each moving body to pass by each link section to calculate an average speed of each moving body in each link section; and add respective average speeds of the moving bodies which have run in any one link section for a predetermined period of time, and divide the sum of the average speeds by a total number of the moving bodies which have run in the corresponding link section to calculate an average speed of the entirety of the moving bodies in the corresponding link section.

The method may further include when the average speed of the moving body is lower than a predetermined speed, determining the corresponding link section as a congested section; and when the average speed of the moving body is equal to or higher than the predetermined speed, determining the corresponding link section as a non-congested section.

The method may further include: when a route guidance service is required from a route guidance device, determining a contested section and a non-congested section in a driving route to a destination of the moving body; and providing the route guidance service including lane change guidance to the route guidance device on the basis of the determined congested section and non-congested section.

According to another exemplary embodiment of the present invention, a computer-readable recording medium including a program for executing the route guidance method may be provided.

According to another exemplary embodiment of the present invention, a program stored in a computer-readable recording medium to execute the route guidance method may be provided.

Advantageous Effects

According to the present invention, when a vehicle needs to change directions, the vehicle may easily change directions by changing lanes before entering a congestion section when directions need to be changed, and safely drive by preventing unnecessary violation of traffic regulations or a traffic accident.

BEST MODES

Hereinafter, exemplary embodiments of the present invention will be described in detail with reference to the drawings. In the following description of the present invention, when a detailed description of relevant known functions or configurations is determined to unnecessarily obscure an important point of the present invention, the detailed description will be omitted.

Figure 1:
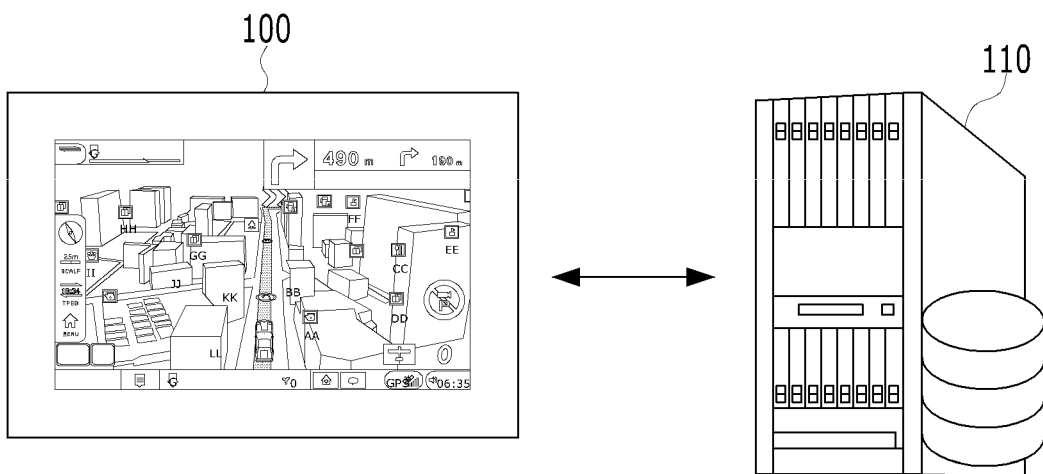
FIG. 1 is a view illustrating a route guidance system according to an exemplary embodiment of the present invention.

FIG. 1 is a view illustrating a route guidance system according to an exemplary embodiment of the present invention.

Referring to FIG. 1, the route guidance system 10 of the present invention includes a route guidance device 100 and a server 110.

The route guidance device 100 is a device for guiding a route for a user may reach a destination. For example, the route guidance device 100 may be a device for displaying route information for a user, such as a navigation device, a smartphone, a smart pad, a smart glass, and the like. In the present invention, the route guidance device 100 uses high-definition map data for route guidance, and the high-definition map refers to a map including location and shape information of all fixed objects in roads. Using the high-definition map data, the route guidance device 100 may be able to guide a route by lane, and the route guidance device 100 displays route information on a lane-by-lane basis. The route guidance device 100 may be installed in a moving body and transmit route information for a destination selected by a user, location information of a vehicle, operation time information, and the like, to the server 110. Here, the moving body may include a movable object, such as a vehicle, a person, a bicycle, a ship, a train, and the like. Hereinafter, for the purposes of description, a case where the moving body is a vehicle will be described as an example.

A lane is a concept distinguished from a line. The lane refers to a portion of a road on which a vehicle runs. When a road includes a plurality of lanes, the plurality of lanes may be divided by lines. The line refers to a band-shaped line for dividing the plurality of lanes included in the road, and a driver may run safely and smoothly using these lines.

The server 110 collects and processes traffic situation information and transmits the processed information to the route guidance device 100. When high-definition map data or firmware needs to be updated, the server 110 transmits corresponding information to the route guidance device 100 to update the high-definition map data or the firmware. In particular, since high-definition map provides shape information of all fixed objects in the road, it is necessary to quickly apply a change in a road environment such as an accident, a construction section, and the like. Thus, the server 110 periodically determines whether the high-definition map data needs to be updated, and transmits update information to the route guidance device 100.

Figure 2:
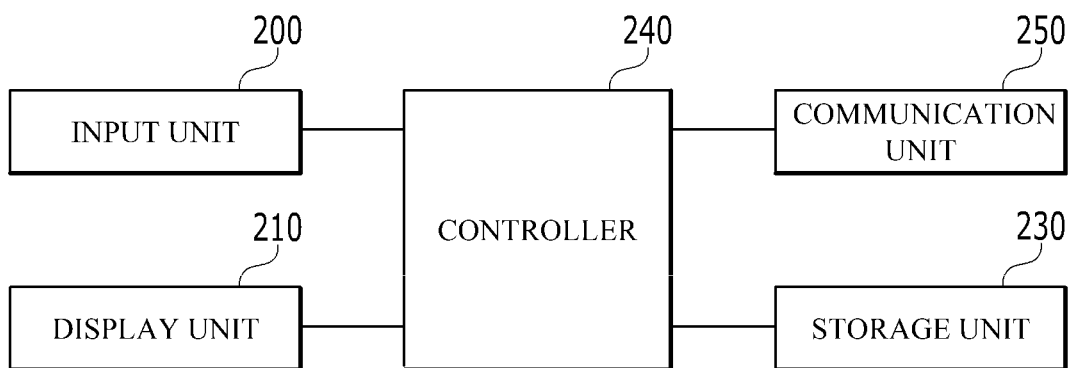
FIG. 2 is a view illustrating a configuration of a route guidance device according to an exemplary embodiment of the present invention.

FIG. 2 is a view illustrating a configuration of the route guidance device 100 according to an exemplary embodiment of the present invention.

Referring to FIG. 2, the route guidance device 100 of the present invention includes an input unit 200, a display unit 210, a communication unit 250, a storage unit 230, and a controller 240.

The input unit 200 serves to convert a physical input from the outside into a specific electric signal. The input unit 200 may receive a user input such as a touch, a push operation, a voice, or the like, from the user or a sound generated from the inside and the outside of the vehicle. The input unit 200 may be realized using various types of buttons, a touch sensor for receiving a touch input, a proximity sensor for receiving an approaching motion, and the like.

The display unit 210 displays route information using the high-definition map data and may be formed integrally with the route guidance device 100 or installed separately from the route guidance device 100 such as a head-up display (HUD).

The communication unit 250 is for communicating with other devices such as the server 110 and may specifically include some or all of a location data unit (not shown), a wireless Internet unit (not shown), a broadcast transmission/reception unit (not shown), a mobile communication unit (not shown), a short-range communication unit (not shown), and a wired communication unit (not shown). The location data unit is a unit for acquiring location data through a global navigation satellite system (GNSS). The GNSS refers to a navigation system capable of calculating a location of a receiving terminal using a radio signal received from a satellite. A specific example of the GNSS is a global positioning system (GPS), a differential GPS (DGPS), a Galileo, a global orbiting navigational satellite system (GLONASS), a COMPASS, an Indian regional navigational satellite system (IRNSS), and a quasi-zenith satellite system (QZSS) depending on an operator. The location data unit may acquire location data by a GNSS signal provided in a use area.

The wireless Internet unit is a unit for accessing the wireless Internet to acquire or transmit data. The wireless Internet that may be accessed through the wireless Internet unit may include a wireless LAN (WLAN), a wireless broadband (Wibro), a world interoperability for microwave access (Wimax), high speed downlink packet access (HSDPA), or the like. The broadcast transmission/reception unit is a unit for transmitting/receiving a broadcast signal through various broadcasting systems. A broadcasting system which may transmit/receive a broadcast signal through the broadcast transmission/reception unit may include digital multimedia broadcasting terrestrial (DMBT), a digital multimedia broadcasting satellite (DMBS), media forward link only (Media FLO), digital video broadcast handheld (DVBH), integrated services digital broadcast terrestrial (ISDBT), or the like. The broadcast signal transmitted/received through the broadcast transmission/reception unit may include traffic data, living data, or the like.

The mobile communication unit may access a mobile communication network to perform communication according to various mobile communication standards such as 3rd generation (3G), 3rd generation partnership project (3GPP), and long term evolution (LTE). The short-range communication unit is a device for short-range communication and may perform communication via Bluetooth, radio frequency identification (RFID), infrared data association (IrDA), ultra wideband (UWB), ZigBee, near field communication (NFC), and the like. The wired communication unit is an interface unit which may be connected to another device in a wired manner and may be a USB module for performing communication through a USB port.

The storage unit 230 serves to store various data and applications. For example, the storage unit 230 may store an OS, a route search application, map data, searched route data, a received image, and the like. The storage unit 230 may be implemented as a detachable storage unit such as a USB memory, as well as as a built-in storage unit such as a random access memory (RAM), a flash memory, a read only memory (ROM), an erasable programmable ROM (EPROM), an electronically erasable and programmable ROM (EEPROM), a register, a hard disk, a removable disk, a memory card, or a universal subscriber identity module (USIM).

The controller 240 generally controls the route guidance device 100 of the present invention. That is, the controller 240 determines and displays a route to a destination according to a user's input, and when a lane needs to be changed, the controller 240 provides guidance to change lanes in consideration of a congested section.

Figure 3:
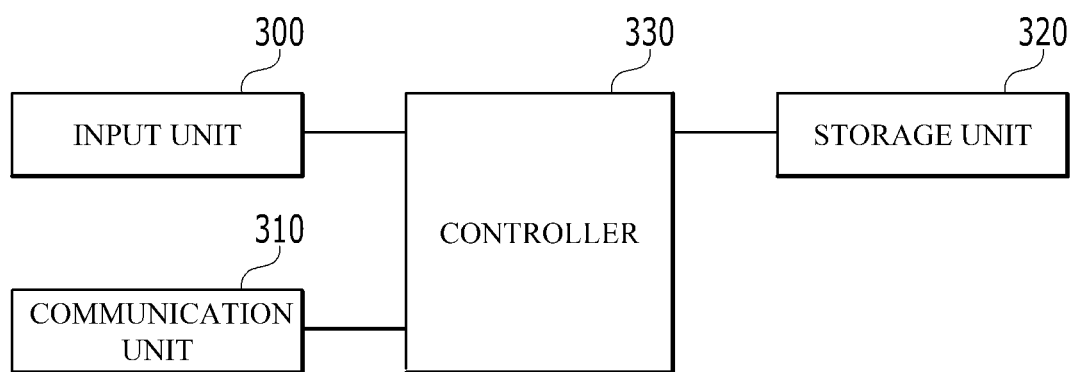
FIG. 3 is a view illustrating a configuration of a server according to an exemplary embodiment of the present invention.

FIG. 3 is a view illustrating a configuration of the server 110 according to an exemplary embodiment of the present invention.

Referring to FIG. 3, the server 110 of the present invention includes an input unit 300, a communication unit 310, a storage unit 320, and a controller 330.

The input unit 300 receives a command for performing an operation from the user and may be configured as a key pad, a dome switch, a touch pad (resistive/capacitive), a jog wheel, a jog switch, a push button, or the like.

The communication unit 310 serves to communicate with other devices such as the route guidance device 100. Specifically, the communication unit 310 may include all or some of a wireless Internet unit (not shown), a broadcast transmission/reception unit (not shown), a short-range communication unit (not shown), a mobile communication unit (not shown), and a wired communication unit (not shown), all of which are described above.

The storage unit 320 serves to store various data and applications. For example, the storage unit 320 may store an OS, a route search application, map data, and searched path data, and the like. The storage unit 230 may be realized as a detachable storage unit such as a USB memory as well as a built-in storage device as described above. The storage unit 320 may be realized as an external data base server connected to the server 110.

The controller 330 generally controls the server 100 of the present invention. That is, the controller 330 processes the collected traffic situation information and transmits the processed traffic situation information to the route guidance device 100. If the vehicle needs to change lanes, the controller 330 checks a congestion section and transmits lane change information to the route guidance device 100 so that the vehicle may change lanes before entering the congested section.

Figure 4:
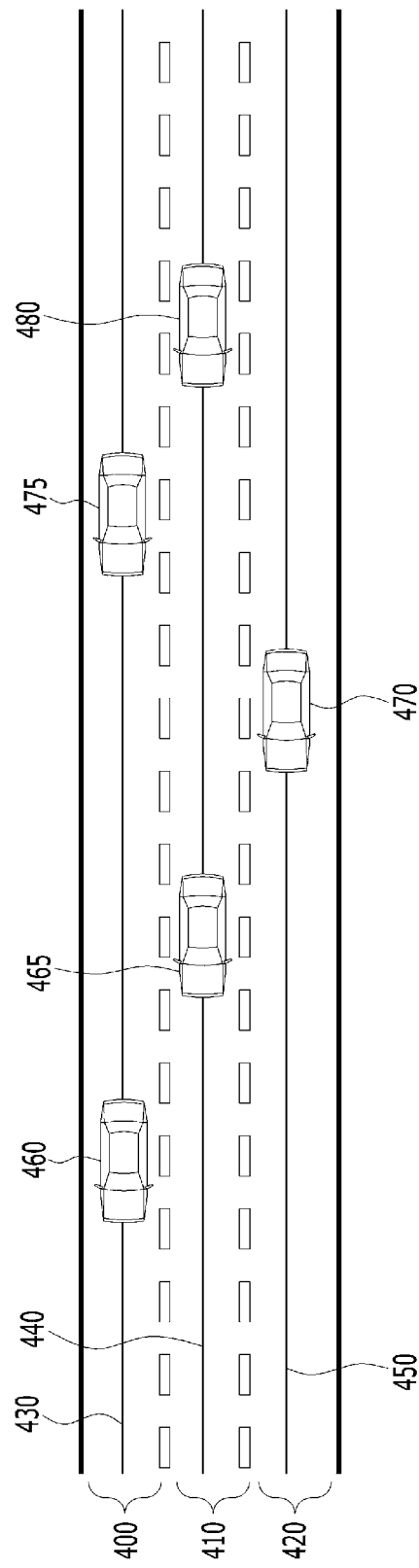
FIGS. 4 and 5 are views illustrating a route guidance method according to an exemplary embodiment of the present invention.
Figure 5:
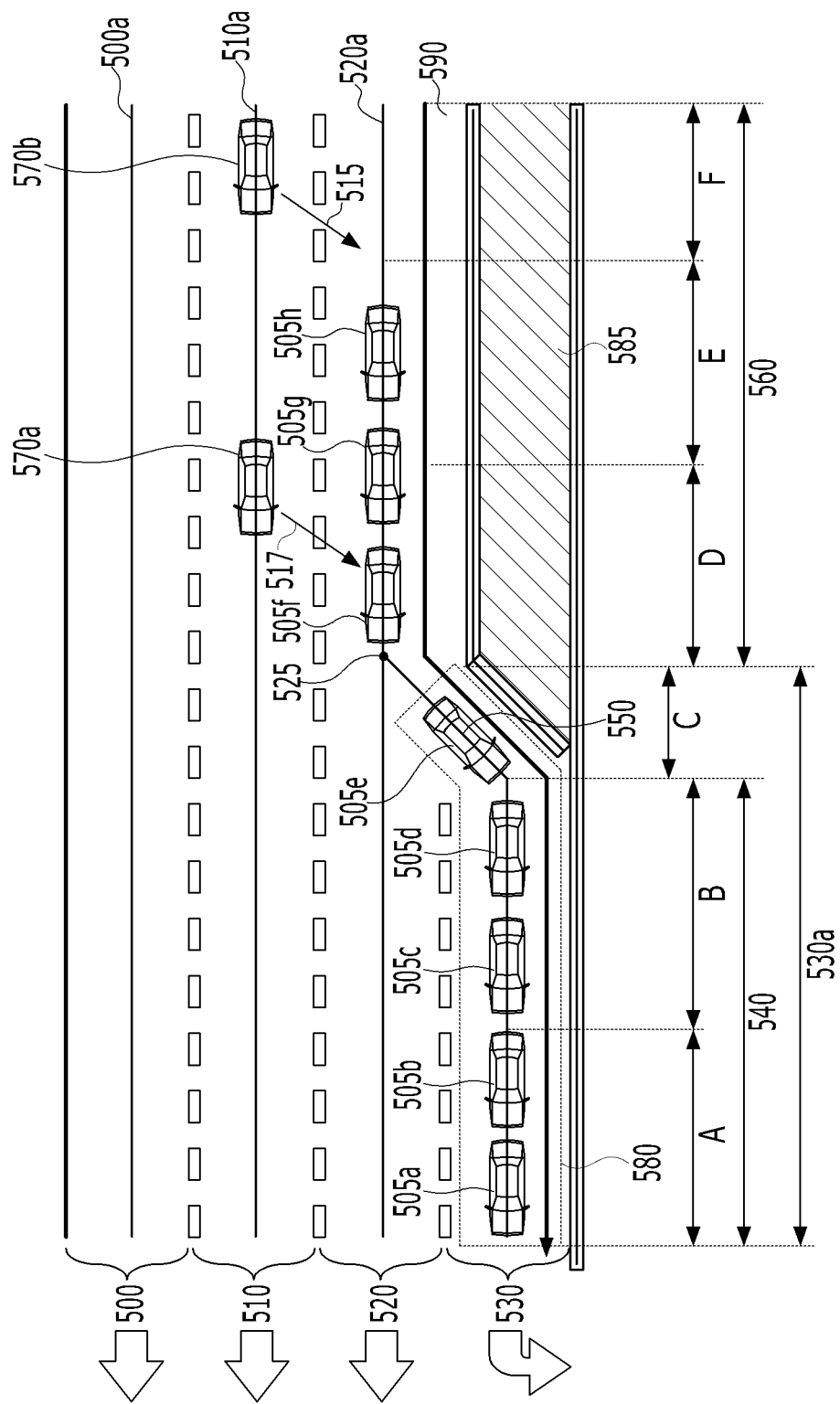

FIGS. 4 and 5 are views illustrating a route guidance method according to an exemplary embodiment of the present invention.

Referring to FIG. 4 illustrating a running state of a plurality of vehicles on a road including three lanes, the road may include a first lane 400, a second lane 410, a third lane 420, and lines demarcating the plurality of lanes. In addition, a moving direction indication line of the road, a traffic light, and the like may be provided.

Each of the plurality of lanes may be assigned a link. Here, the "link" refers to an electronically shaped road section connecting nodes according to a geometric line form of road. The node refers to an electronically shaped spot at which a traffic flow is changed, such as an intersection, a junction, a tunnel entrance, or the like. In the example of FIG. 4, a link 430 may be assigned to the first lane 400, a link 440 may be assigned to the second lane 410, and a link 450 may be assigned to the third lane 430.

Meanwhile, the route guidance device 100 according to an exemplary embodiment of the present invention may display the shape of the road shown in FIG. 4 to perform route guidance. The shape of the road displayed through the route guidance device 100 is preferably displayed to be the same as or similar to an actual road using road information, and to this end, map data is preferably periodically updated.

Meanwhile, the server 110 may receive location information, operation time information, and the like of the vehicle from a communication means installed in the vehicles 460, 465, 470, 475, and 480 running on the road, check a lane or link in which each vehicle is running using a location of each vehicle, and determine an average speed of each vehicle in a corresponding lane and a corresponding link. Specifically, in the present invention, a lane or a link may be divided into predetermined length units, and an identification information (ID) may be assigned to each of the divided units. For example, a total length from point K to point T may be divided into predetermined lengths, and an ID may be assigned to each section to generate a lane ID or a link ID. For example, in a case where a zone from the point K to the point T is divided into five sections, IDs from ID1 to ID5 may be assigned as lane IDs or link IDs to the sections, respectively. Here, the lengths of the lanes or links respectively identified by the lane IDs or the link IDs may be equal or different, and lane IDs or link IDs are previously determined to be matched to the lengths of the lanes or the links, respectively.

The server 110 may know a corresponding lane ID or a corresponding link ID matched to a spot where a vehicle is located using the location information of the vehicle, and know a length of the corresponding lane or the corresponding link through the lane ID or the link ID. Also, the server 110 may know a time during which the vehicle is operated at the corresponding lane or link through the operation time information of the vehicle and calculate an average speed of the vehicle at the corresponding section. For example, as for a link, an average speed V of the vehicle at the corresponding link may be obtained by dividing length L of the corresponding link by time T taken for the vehicle to pass by the corresponding link, and the time T taken for the vehicle to pass by the corresponding link may be a difference between a time when the vehicle passes by an endpoint of the link and a time when the vehicle passes by a start point of the link. When this process is performed on each vehicle, an average speed of each vehicle may be calculated, and an average speed of the corresponding link may be determined by adding average speeds of the vehicles operated during a predetermined period of time at the corresponding link and dividing the sum of the average speeds by a total number of the operated vehicles. In the present invention, a traffic flow at the corresponding link may be determined by comparing the calculated average speed with a predetermined reference speed. If the calculated average speed is equal to or higher than the reference speed, it is determined that a traffic flow is smooth, and if the calculated average speed is less than the reference speed, it is determined that the traffic flow is congested or slow. In the present invention, the method of calculating the average speed at the link may be expressed by Equation 1 below.

$$\frac{\sum_{i=1}^{n} \frac{length_{link}}{E_{node}(t) - S_{node}(t)}}{N} \quad \text{[Equation 1]}$$

n: nth vehicle
N: The number of vehicles which have passed by the corresponding link per unit time
$length_{link}$: Length of the corresponding link
$S_{node}(t)$: Time at which the vehicle has passed by a start point (node) of the corresponding link
$E_{node}(t)$: Time at which the vehicle has passed by an end point (node) of the corresponding link When the average speed of the vehicle at each lane or link regarding a specific section is determined by Equation 1, whether a flow of vehicles is smooth or congested may be known, and in case of continuous congestion, rather than temporary congestion, the specific section may be determined as a constant congested section and the vehicle may be guided to use a bypass. Here, if the average speed of the vehicle is lower than a predetermined speed, it may be determined that the vehicles are congested.

Meanwhile, in order for the vehicle which goes straight to change directions such as left (right) turn or U-turn, the vehicle must change a lane to a redirection lane (or a direction change lane) in which left (right) turn or U-turn is allowed. Here, if the redirection lane or a lane adjacent to the redirection lane is congested, it may be difficult to know at which spot the vehicle is to make a lane change. To this end, in the present invention, the lane or the link may be subdivided to differentiate between a congested section and a non-congested section in the lane or the link and related information may be transmitted to the route guidance device 100 so that the vehicle may changes lanes before entering the congested section.

In the present invention, the lane IDs or the link IDs are previously stored to be matched to direction information, and when congestion occurs in the redirection lane or the lane adjacent to the redirection lane, the server 110 subdivides a section corresponding to the link ID or the lane ID included in the redirection lane or the lane adjacent to the redirection lane to differentiate between a congested section and a non-congested section. The lane IDs and the link IDs may have a hierarchical structure as shown in Table 1 below according to road numbers assigned to the whole country.

TABLE 1

| Road ID | Lane ID | Link ID |
|---------|---------|---------|
| 1 | Lane ID 1 | Link ID 1 |
| | Lane ID 1 | Link ID 2 |
| | Lane ID 1 | Link ID 3 |
| | . | . |
| | . | . |
| | . | . |
| | Lane ID 2 | Link ID 1 |
| | Lane ID 2 | Link ID 2 |
| | Lane ID 2 | Link ID 3 |
| | . | . |
| | . | . |
| | . | . |
| | Lane ID N | Link ID N |
| 2 | Lane ID 1 | Link ID 1 |
| | . | . |
| | . | . |
| | . | . |

Table 1 shows part of the hierarchical structure of the lane IDs and the link IDs assigned to road #1 and road #2. Table 1 shows only the lane and link identification information (IDs), and attribute information corresponding to each lane and link may be implemented in the form of Table 2 below. Table 2 below shows attribute information of a link having a link ID of "1" in a first lane of road #1.

TABLE 2

| Road ID | Lane ID | Link ID | Attribute information | Description |
|---------|---------|---------|-----------------------|-------------|
| 1 | 1 | 1 | Direction information | Go straight, left turn, go straight and left turn, right turn |
| | | | Speed limit information | Maximum limit speed |
| | | | Node information | Node location |
| | | | Link start point information | Link start node location |
| | | | Link end point information | Link end node location |
| | | | Road rank | Information indicating rank of road (expressway, general road) |
| | | | Road type | Road type information (underground road, uphill road, etc.) |
| | | | Road width | Road width information |

Here, a length of each subdivided section may be previously determined. For example, the length of each subdivided section may be determined to correspond to about 3 to 5 vehicles or 1 to 3 vehicles, here, a reference for the vehicle may be a passenger car, a bus, or the like. The lengths of the sections may be equal or different. In addition, the server 110 calculates an average speed of the vehicles at each set section. Here, as described above, an average speed (Vavg) of each vehicle is calculated by dividing the length of each section by a time taken for each vehicle, which has passed by each section, to pass by the corresponding section, and average speeds of the vehicles operated for a predetermined period of time at the corresponding section are added up and the sum of the average speeds is divided by the total number of vehicles operated in the corresponding section, thus calculating an average speed of the vehicles at each section.

For example, referring to FIG. 5, first to third lanes 500, 510, and 520 are straight lanes and a fourth lane 530 corresponds to a left turn lane. Reference numeral 500a denotes a link of the first lane 500, reference numeral 510a denotes a link of the second lane 510, and reference numeral 520a denotes a link of the third lane 520. Reference numeral 530a includes a link 540 of the fourth lane 530 and a branch link 550 connected to a link 540 of the fourth lane 530 from an advancing point 525. Reference numeral 525 denotes a point branched from the third lane 520 to the fourth lane 530 and may be an entry point or an exit point depending on a point at which it is viewed. Specifically, when viewed on the basis of the third lane 520, the reference numeral 525 may be an exit point (or an advancing point) for exiting (advancing) from the third lane 520. Also, when viewed on the basis of the fourth lane 530, reference numeral 525 may be an entry point for entering the fourth lane 530. Hereinafter, for the purposes of description, reference numeral 525 will be collectively referred to as an exit point.

For example, a route guidance procedure according to an exemplary embodiment of the present invention will be described using a case where the first vehicle 570a and the second vehicle 570b running in the second lane 510 moves to the fourth lane 530 as a redirection lane.

The first and second vehicles 570a and 570b, which are running in the second lane 510, must enter the fourth lane 530, which is a redirection lane, to turn to the left in order to make a left turn at the intersection. However, although the first vehicle 570a wants to enter the third lane 520 in an entry direction of reference numeral 517 in terms of location of the second lane 510, the vehicles 505a to 505h are congested in the fourth lane 530 and in a section adjacent to the branch link 550 for entering the fourth lane 530 from the third lane 520. In this case, it may be difficult for the first vehicle 570a to enter the left-turn lane, and thus, the first vehicle 570a may go straight or may forcedly cut in.

However, in the case of the second vehicle 570b, if the second vehicle 570b changes lanes (reference numeral 515) to the third lane 520 which is not a section in which vehicles 505a to 505h are congested, the second vehicle 570b may easily redirect to turn to the left from the fourth lane 530 which is a left-turn lane as compared with the first vehicle 570a. Reference numeral 515 indicates a moving direction to make a lane change to the fourth lane 530 to make a left turn while the second vehicle 570b is running in the second lane 510 according to an exemplary embodiment of the present invention.

Reference numeral 585 denotes a safe space in which a flower bed or a median strip may be located. Reference numeral 580 denotes a dotted line box starting from the exit point 525 and indicates a vehicle's advancing route when advancing from the third lane 520 to the fourth lane 530. Referring to FIG. 5, vehicles 505a, 505b, 505c, 505d, and 505e are running in the advancing route.

To this end, the server 110 according to the exemplary embodiment of the present invention may divide the first link 540 of the fourth lane 530 included in a route along which the second vehicle 570b should run as indicated by reference numeral 590, the second link 550 of the third lane 520, and the second link 550 connecting the first link 540 and the third link 560 into predetermined section units. For example, the server 110 may divide the first link 540 into section A and section B, the third link 560 into sections D, E, and F, and assign only section C which is one section to the second link 550 because the second link 550 is not long enough to be divided into predetermined units.

In FIG. 5, the server 110 calculates an average speed in the sections A to E. Since the vehicles are stationary in the sections A to D as shown in FIG. 5, the average speed of the vehicles calculated according to Equation 1 is lower than a predetermined speed, and thus, the server 110 determines the corresponding sections as vehicle congested sections. However, since sections E and F are the spots where congestion of the vehicle is terminated, an average speed of the vehicles calculated according to Equation 1 may exceed the predetermined speed, and thus, the server 110 may determine the sections E and F sections as non-congested sections. Accordingly, the server 110 transmits lane change information to the route guidance device 100 of the second vehicle 570b which wants to enter the third lane 520 as indicated by reference numeral 515 to make a lane change in the section E or F. Upon receiving the lane change information, the route guidance device 100 controls a driving direction of the vehicle so that the second vehicle 570b may drive along the driving route indicated by reference numeral 590.

The route guidance device 100 may inform the user to change lanes using the lane change information received from the server 110 or transmit a lane change control signal to a control device of the vehicle so that the vehicle may change lanes. In FIG. 5, it is described that the link is subdivided as an example, but route guidance may also be performed in the same or similar manner by subdividing a lane instead of the link.

In FIG. 5, an intersection is described as an example to which an exemplary embodiment of the present invention is applied but the present invention is not limited thereto and may also be applied to a situation in which a vehicle must change driving lanes for running, that is, a case where the vehicle must enter a forked road such as an overpass, an underground road, a junction of expressway, or the like.

In an exemplary embodiment of the present invention, as described above, the server 110 collects traffic information to calculate an average speed of vehicles to recognize a congested section. If a direction needs to be changed, the server 110 subdivides the lanes and links identified by IDs to recognize a congested section and a non-congested section and transmits lane change information to the route guidance device 100. That is, in an exemplary embodiment of the present invention, the route guidance device 100 transmits route information, location information of the vehicle, operation time information of the vehicle, and the like, to the server 110, receives information regarding a congested section, lane change information, and the like from the server 110 and performs route guidance. In another exemplary embodiment of the present invention, the server 110 may calculate an average speed of a vehicle in each lane or each link and transmit the speed information to the route guidance device 100, and the route guidance device 100 may determine whether vehicles are congested in each lane or each link corresponding to a route and perform guidance so that a bypass is searched to avoid the congested section or lanes are changed for redirection before entering the congested section. That is, either the server 110 or the route guidance device 100 may selectively perform route guidance by recognizing a congested section in a lane or a link identified by an ID.

Further, in the exemplary embodiment of the present invention, when the vehicle needs to change directions, the lane or link section identified by an ID is subdivided, a non-congested section is recognized, and guidance is provided such that the vehicle changes lanes before entering the congested section. In another exemplary embodiment, without subdividing a lane or the link, it may be determined whether a lane or link section identified by an ID included in the redirection lane or the lane adjacent to the redirection lane is congested, and the vehicle may be guided to make a lane change at a predetermined time before entering a congested lane or a congested link.

Figure 6:
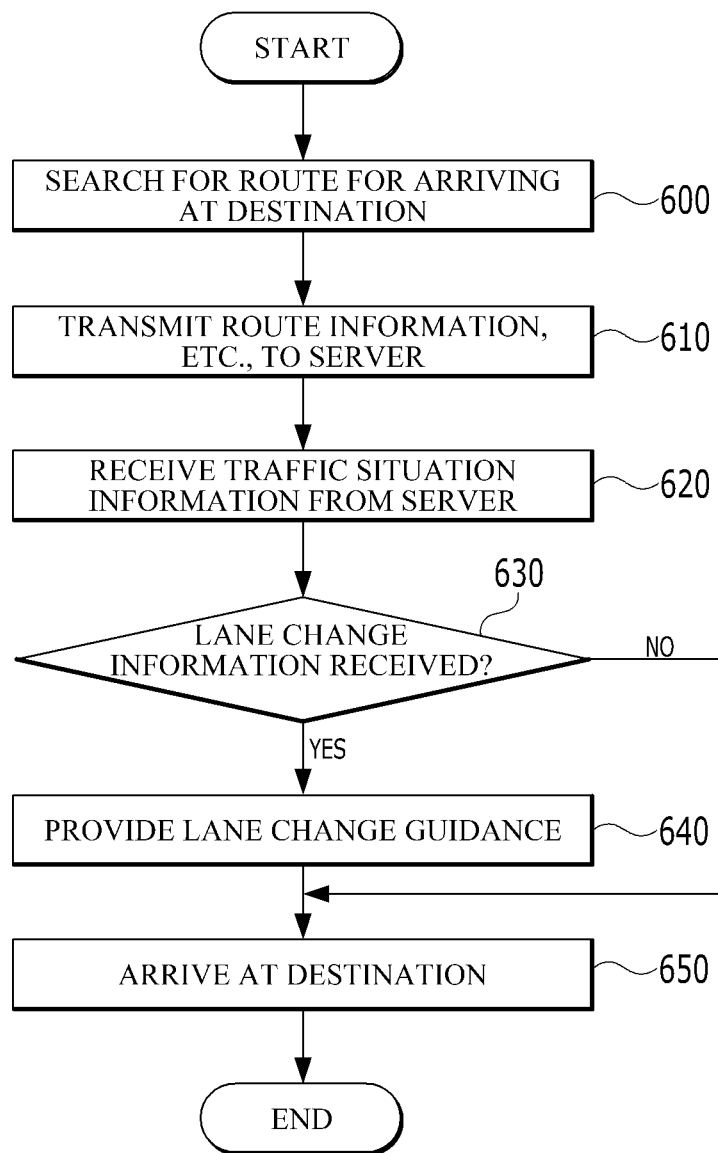
FIG. 6 is a flowchart illustrating a route guidance method in a route guidance device according to an exemplary embodiment of the present invention.

FIG. 6 is a flowchart illustrating a route guidance method in the route guidance device 100 according to an exemplary embodiment of the present invention.

Referring to FIG. 6, when the route guidance device 100 receives information on a destination from the user, the route guidance device 100 searches for a route to reach the destination (step 600). When a route is determined, the route guidance device 100 transmits location information, operation time information, route information, and the like, of the vehicle to the server 110 (step 610). Thereafter, the route guidance device 100 receives traffic situation information from the server 110 and performs route guidance (step 630).

When lane change information is received during driving (Yes in 630), the route guidance device 100 guides the driver to make a lane change (step 640) and continues the route guidance to reach the destination (step 650). In step 640, the controller 240 of the route guidance device 100 may visually output an indication for guiding the user about a moving direction toward the lane to which the vehicle needs to move through the display unit 210, or may output a sound through an auditory device such as a speaker (not shown).

Figure 7:
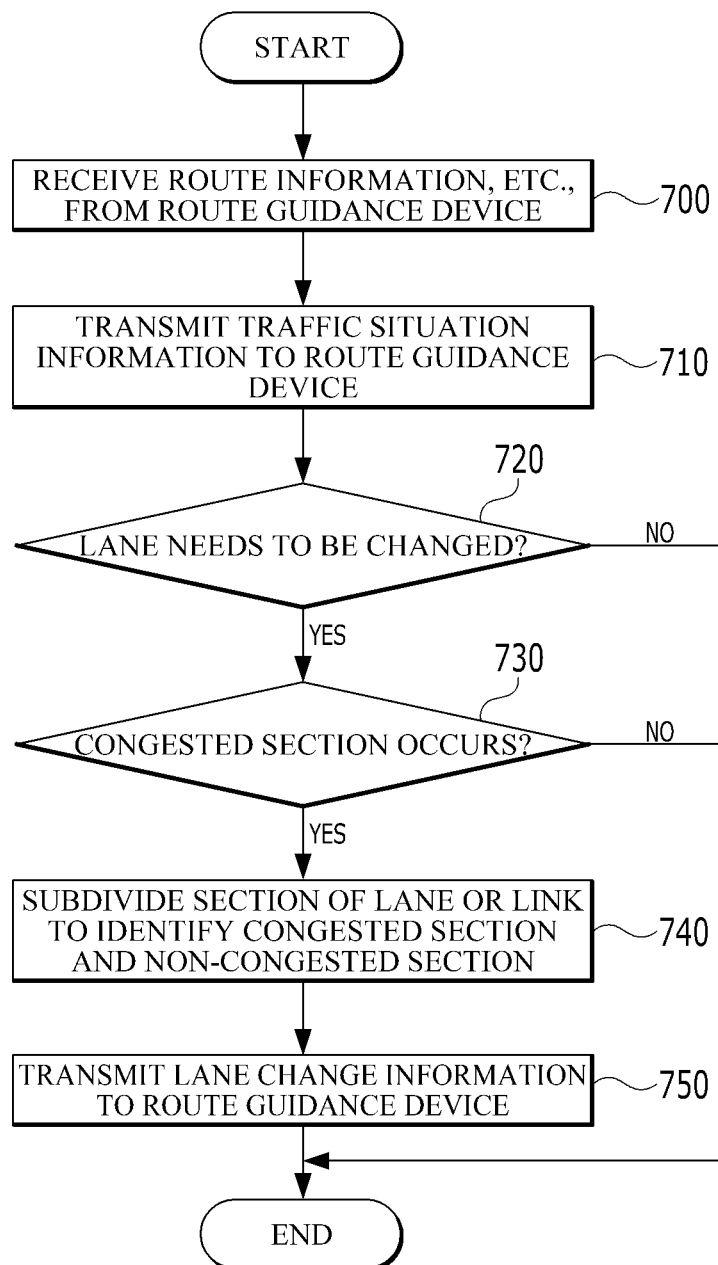
FIG. 7 is a flowchart illustrating a route guidance method in a server according to an exemplary embodiment of the present invention.

FIG. 7 is a flowchart illustrating a route guidance method in the server 110 according to an exemplary embodiment of the present invention.

Referring to FIG. 7, when the location information, the operation time information, the route information, and the like of the vehicle are received from the route guidance device 100 (step 700), the controller 330 of the server 110 processes traffic situation information and transmits the processed information to the route guidance device 100 (step 710). In a case where the vehicle needs to make a lane change for redirection during operation (Yes in step S720), if congestion occurs in the redirection lane or the lane adjacent to the redirection lane (Yes in step 730), the controller 330 of the server 110 subdivides a corresponding section of a lane or a link identified by an ID included in the redirection lane or the lane adjacent to the redirection lane to identify a congested section and a non-congested section (step 740). Here, in an exemplary embodiment, when congestion occurs in the redirection lane or the lane adjacent to the redirection lane regardless of whether the vehicle changes lanes (Yes in step 730), the section may be subdivided to identify a congested section and a non-congested section. Also, the controller 330 of the server 110 transmits lane change information to the route guidance device 100 so that the vehicle may change lanes in the non-congested section before entering the congested section.

Figure 8:
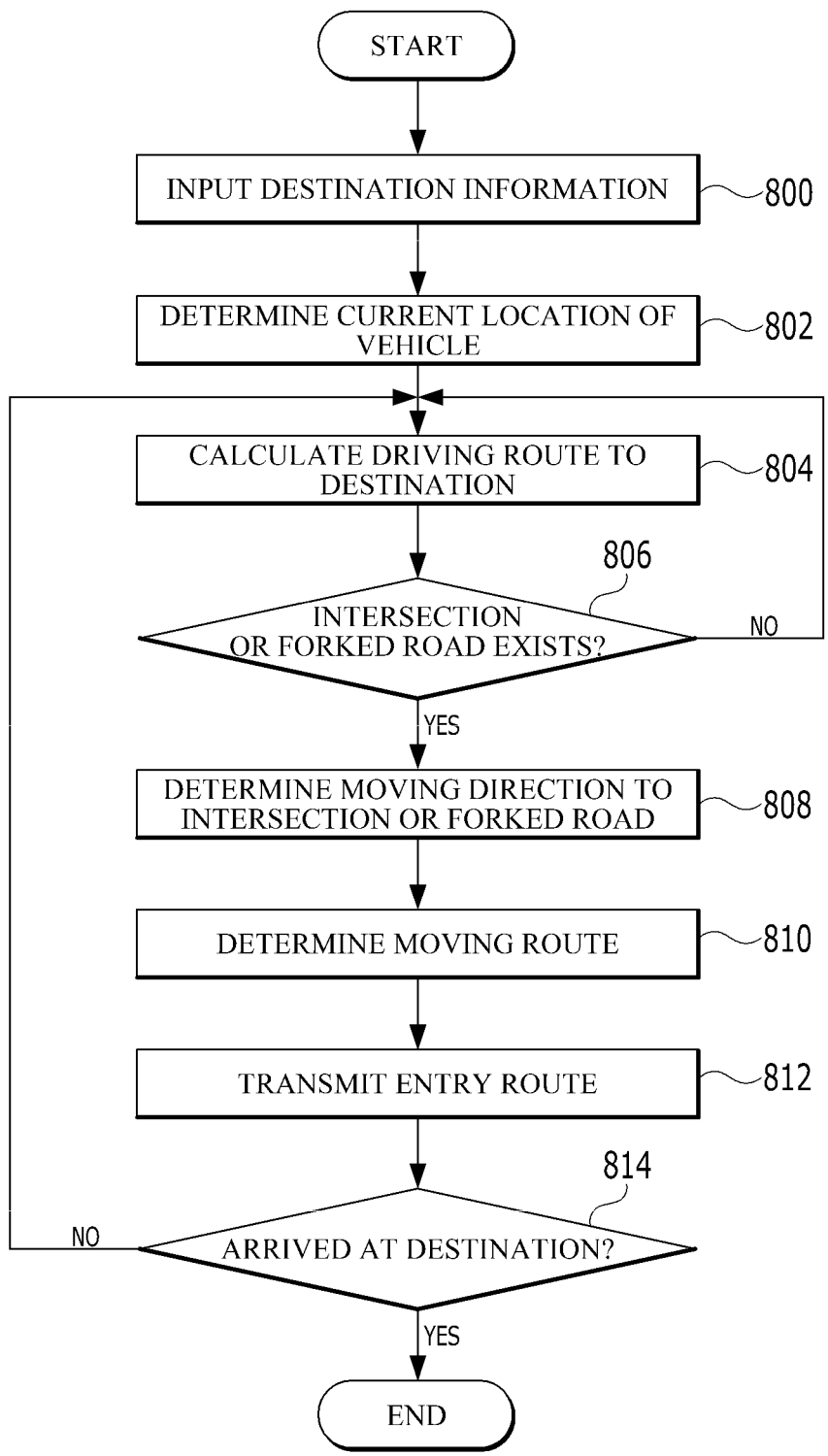
FIG. 8 is a flowchart illustrating a route guidance method in a server according to another exemplary embodiment of the present invention.

FIG. 8 is a flowchart illustrating a route guidance method in a server according to another exemplary embodiment of the present invention.

Referring to FIG. 8, the controller 330 of the server 110 receives destination information from the route guidance device 100 of the vehicle through the communication unit 310 in step 800, and determines a current location of the vehicle in step 802. Here, the controller 330 of the server 110 may determine the current location of the vehicle based on GPS location information of the vehicle included in the destination information received from the route guidance device 100 of the vehicle, or may measure the current location of the vehicle through wireless communication performed between the route guidance device 100 of the vehicle and the communication unit 310 of the server 110.

The controller 330 of the server 110 calculates a driving route from the determined current location of the vehicle to the destination information in step 804, and determines whether an intersection or a forked road exists at a predetermined distance from the current location of the vehicle on the calculated driving route in step 806. According to calculation of the driving route in step 804, lanes located in the driving route of the vehicle and links corresponding to the lanes may be checked. If the intersection or the forked road exists in step 806, the controller 330 of the server 110 checks link information corresponding to the lane where the vehicle is located in step 808 to determine a moving direction toward the intersection or the forked road, and determines an entry route for entering the intersection or the forked road according to the determined moving direction in step 810.

In step 810, in order to determine the entry lane, the controller 330 of the server 110 determines whether the lane on which the vehicle is to run must be changed according to the moving direction toward the intersection or the forked road. If the lane on which the vehicle is to run must be changed, the controller 330 of the server 110 determines a traffic flow on the redirection lane in which the vehicle is to run and the lane adjacent to the redirection lane according to the moving direction. Also, the controller 330 of the server 110 determines an entry route of the vehicle according to the traffic flow.

Figure 9:
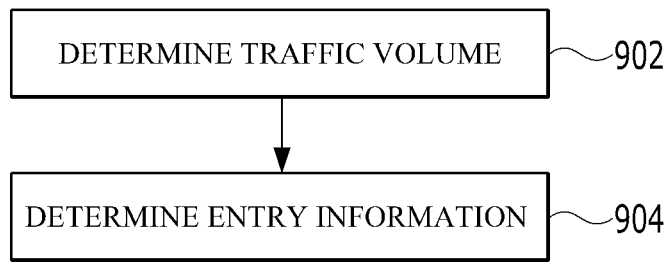
FIG. 9 is a flowchart illustrating a method of determining an entry route in step 810.

FIG. 9 is a flowchart illustrating a method of determining an entry route in step 810.

Referring to FIG. 9, in step 902, if the vehicle needs to move from the current driving lane to the redirection lane so as to run to the intersection or the forked road, the controller 330 determines a traffic volume of the redirection lane and the adjacent lane of the redirection lane in a predetermined unit. Also, the controller 330 determines entry information for changing lanes according to the determined traffic volume in step 904.

In step 902, the controller 330 measures an average speed of the vehicles moving on the link corresponding to the redirection lane and the adjacent lane in the predetermined unit, and determine a traffic volume according to the measured average speed.

Further, if the entry information determined in step 904 is an entry spot indicating a spot which the vehicle is to enter, the controller 330 determines the entry information according to the traffic volume of any one of the redirection lane and the adjacent lane. If the traffic volume is large, the entry spot may be determined as a spot closer than a predetermined reference location.

If it is determined in step 904 that the entry information indicates an entry time indicating a time at which the vehicle is to enter, the controller 330 determines the entry information according to the traffic volume of any one of the redirecting lane and the adjacent lane. If the traffic volume is large, the entry time may be determined as a time earlier than a predetermined reference time.

Meanwhile, if the intersection or the forked road does not exist in step 806, the controller 330 of the server 110 calculates a driving route to the destination in step 804.

The controller 330 of the server 110 transmits the entry information determined in step 810 to the vehicle in step 812, and determines whether the vehicle has completed running to the destination in step 814. If running to the destination has not been completed yet, the process returns to step 804.

Although it is described that the process is performed by the server 110 with reference to FIGS. 8 and 9, the process may also be performed in the route guidance device 100. For example, in the case of an unmanned vehicle which is operated by itself to the destination without a driver's operation, the route guidance device 100 may generate a control signal for causing the vehicle to move along the determined entry route and transfers the generated control signal to a control device of the vehicle to control the vehicle to automatically change lanes. As another example, the vehicle may be realized as a manned vehicle which is operated by a driver, and in this case, the route guidance device 100 may visually or audibly output the determined entry route to the user.

Figure 10:
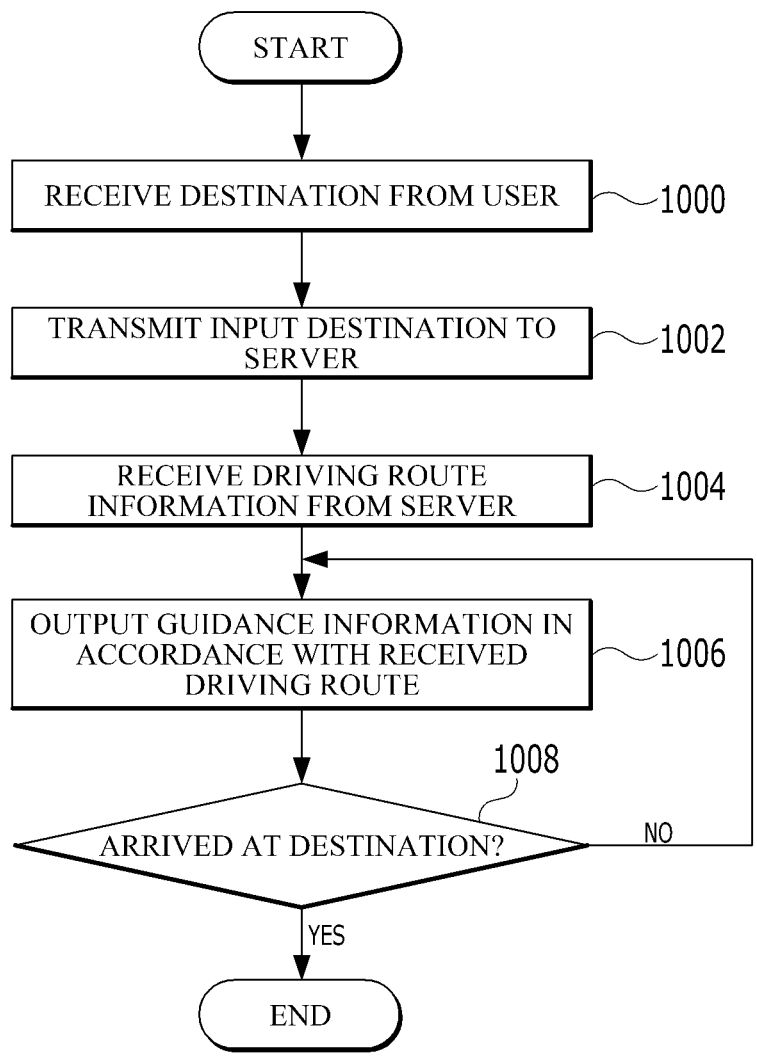
FIG. 10 is a flowchart illustrating a route guidance method of a route guidance device according to another exemplary embodiment of the present invention.

FIG. 10 is a flowchart illustrating a route guidance method of a route guidance device according to another exemplary embodiment of the present invention.

When a destination is received from the user through the input unit 200 in step 1000, the controller 240 of the route guidance device 100 transmits the input destination to the server 110 through the communication unit 250 in step 1002.

When calculated driving route information is received from the server through the communication unit 250 in step 1004, the controller 240 outputs guide information on the display unit 210 according to the received driving route information in step 1006. Here, in step 1006, the controller 240 may generate control information for driving the vehicle according to the received driving route information, and output the generated control information to a vehicle control device (not shown).

In step 1004, the controller 240 may determine whether an intersection or a forked road exists at a predetermined distance from the current location of the vehicle through the driving route information received from the server and whether the vehicle should move toward the intersection or the forked road.

If it is determined that the vehicle must enter the intersection or the forked road in step 1004, the vehicle may receive an entry route for entering the intersection or the forked road from the link corresponding to the lane in which the vehicle is located, from the server, before entering the intersection or the forked road.

In this case, if the lane on which the vehicle is to drive is to be changed so as to move toward the intersection or the forked road, the entry route may include an entry spot to enter the intersection or the forked road determined according to a traffic flow on the redirection lane in which the vehicle is to drive and the lane adjacent to the redirection lane according to the moving direction.

In step 1008, when the vehicle arrives at the destination, the controller 240 terminates the route guidance, while if the vehicle has not arrived yet at the destination, the controller 240 returns to step 1006.

According to the above-described example, the in the case where a lane on which the vehicle is to drive must be changed in order to move toward the intersection or the forked road, the entry spot or the entry time is determined on the basis of a real-time traffic flow on the redirection lane in which the vehicle is to drive and the lane adjacent to the redirection lane but the present invention is not limited thereto.

According to another exemplary embodiment of the present invention, traffic statistics information by day or by time zone (e.g., information indicating congestion or non-congestion) may be established by analyzing a user log (lane or link passage time, etc.) regarding each of a plurality of lanes or links corresponding to the lanes constituting a road. In this case, a congested section and a non-congested section may be identified in a lane or a link by subdividing the lane or the link. This data may be previously generated on the basis of the user log, and the storage unit of the route guidance device 100 or the server 110 may store the previously generated information indicating congestion by day or by time zone. According to the present invention, an entry route guidance may be performed using statistics data accumulated on the basis of a huge amount of data which have been acquired, without having to determine a congestion section and a non-congestion section of each lane or link in real time.

The present invention has been described above with reference to preferred exemplary embodiments thereof. It should be understood that all exemplary embodiments and conditional examples disclosed herein are intended to assist the reader in understanding the principles and concepts of the present invention by a person skilled in the art, and the person skilled in the art will understand that the invention may be embodied in various other forms without departing from the spirit or essential characteristics thereof.

In addition, it should be understood that all the detailed descriptions for specific exemplary embodiments, as well as the principle, perspectives, and exemplary embodiments intentionally include structural and functional equivalents of such matters. Also, it should be understood that the equivalents include all the devices invented to perform the same functions irrespective of the equivalents, i.e., structures, to be developed in the future, as well as currently known equivalents.

Thus, all flow charts, state transition diagrams, pseudo-codes, and the like, may be understood to be substantially represented in a computer-readable medium and represent various processes performed by a computer or a processor, no matter whether the computer or the processor is clearly illustrated.

Functions of processors or various elements illustrated in the drawings including functional blocks represented as concepts similar to the processors may be provided by using hardware having the ability to execute appropriate software as well as dedicated hardware. When provided by the processor, the functions may be provided by a single dedicated processor, a single shared processor or a plurality of individual processors, some of which can be shared.

In the specification and the claims, terms such as "first", "second", "third", "fourth" and the like, if any, will be used to distinguish similar components from each other and be used to describe a specific sequence or a generation sequence, but are not necessarily limited thereto. It may be understood that these terms are compatible with each other under an appropriate environment so that exemplary embodiments of the present invention described herein may be operated in a sequence different from the sequence shown or described herein. Likewise, in the present specification, in the case in which it is described that a method includes a series of steps, a sequence of these steps suggested herein is not necessarily a sequence in which these steps may be executed. That is, any described step may be omitted and/or any other step that is not described herein may be added to the method.

In the present disclosure, suffixes such as "module", "part" or "unit" used for referring to elements are given merely to facilitate explanation of the present invention, without having any significant meaning or role by themselves.

Terms used in the present specification are for explaining exemplary embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Also, the methods according to various exemplary embodiments of the present invention described above may be implemented in the form of installation data and provided, to a server or devices, in a state of being stored in various non-transitory computer readable media. Accordingly, each device may access the server or the devices in which the installation data is stored, and download the installation data.

The non-transitory computer readable medium is a medium that semi-permanently stores data therein, rather than a medium storing data for a short time such as a register, a cache, a memory, or the like, and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, and a read only memory (ROM).

While the present invention has been described and illustrated with reference to the preferred exemplary embodiments, the present invention is not limited to the above-described specific exemplary embodiments, and it will be understood that various modifications and variations may be made therein by those skilled in the art to which the present invention pertains, without departing from the scope of the present invention as defined by the appended claims. These modifications and variations should not be understood separately from the technical spirit and prospect of the present invention.

The invention claimed is:

1. A route guidance method for performing lane change guidance in consideration of a congested lane section, the route guidance method comprising:
calculating a driving route from a current location of a moving body to a destination;
determining whether an intersection or a forked road exists at a predetermined distance from the current location of the moving body on the calculated driving route;
checking, when the intersection or the forked road exists, link information corresponding to a lane in which the moving body is located, and determining a moving direction toward the intersection or the forked road;
determining an entry route for entering the intersection or the forked road according to the determined moving direction;
wherein the determining of an entry route includes:
determining whether a lane for the moving body to run in is to be changed according to the moving direction toward the intersection or the forked road; and
if the lane for the moving body to run in is to be changed, determining a traffic flow on a redirection lane in which the moving body is to run and a lane adjacent to the redirection lane according to the moving direction,
wherein the determining the traffic flow includes:
dividing respective links corresponding to a plurality of lanes constituting a road into sections; and
determining the traffic flow by measuring a traffic volume for each of the divided link sections,
wherein the traffic flow of the divided link sections comprises a congestion section and a non-congestion section; and
determining an entry spot of the moving body according to the determined traffic flow.

2. The route guidance method of claim 1, wherein the determining of a traffic flow includes:
when the moving body is to move from a current driving lane to a redirection lane to run to the intersection or the forked road, determining a traffic volume of the redirection lane and an adjacent lane of the redirection lane in a predetermined unit; and
determining entry information for changing lanes according to the determined traffic volume.

3. The route guidance method of claim 2, wherein the determining of a traffic volume in a predetermined unit includes:
measuring an average speed of moving bodies moving on a link corresponding to the redirection lane and the adjacent lane in the predetermined unit; and
determining the traffic volume according to a result of comparing the measured average speed with a predetermined reference speed.

4. The route guidance method of claim 3, wherein the determining of entry information includes determining an entry spot for entering a section in which the measured average speed is faster than the reference speed.

5. The route guidance method of claim 2, wherein when the entry information indicates an entry spot for the moving body to enter, the entry information is determined according to a traffic volume of any one of the redirection lane and the adjacent lane, and when the traffic volume is large, the entry spot is determined as a spot closer than a predetermined reference position.

6. The route guidance method of claim 2, wherein when the entry information indicates an entry time for the moving body to enter, the entry information is determined according to a traffic volume of any one of the redirection lane and the adjacent lane, and when the traffic volume is large, the entry time is determined as a time earlier than a predetermined reference time.

7. The route guidance method of claim 1, wherein the redirection lane is a lane in which a moving direction is indicated by an arrow on a road and include at least one of a left turn lane, a right turn lane, a go-straight and left turn available lane, and a go-straight and right turn available lane.

8. The route guidance method of claim 1, further comprising:
displaying the determined moving direction for a user.

9. The route guidance method of claim 1, further comprising:
generating a control signal for controlling a moving direction of the moving body according to the determined entry route.

10. The route guidance method of claim 1, further comprising:
receiving destination information from the moving body.

11. A route guidance device for performing lane change guidance in consideration of a congested lane section, the route guidance device comprising:
a communication unit receiving destination information from a moving body; and
a controller calculating a driving route from a current location of the moving body to the destination information, determining whether an intersection or a forked road exists at a predetermined distance from the current location of the moving body on the calculated driving route, checking, if the intersection or the forked road exists, link information corresponding to a lane in which the moving body is located, determining a moving direction toward the intersection or the forked road, determining an entry route for entering the intersection or the forked road according to the determined moving direction,
wherein the controller determines whether a lane for the moving body to run in is to be changed according to the moving direction toward the intersection or the forked road, and if the land for the moving body to run in is to be changed, the controller determines a traffic flow in a redirection lane in which the moving body is to run and a lane adjacent to the redirection lane according to the moving direction, and determines an entry spot of the moving body according to the determined traffic flow, wherein the controller divides respective links corresponding to a plurality of lanes constituting a road into sections and determines the traffic flow by measuring a traffic volume for each of the divided link sections, and wherein the traffic flow of the divided link sections comprises a congestion section and a non-congestion section.

12. The route guidance device of claim 11, wherein the controller determines a traffic volume of the redirection lane and an adjacent lane of the redirection lane in a predetermined unit when the moving body is to move from a current driving lane to a redirection lane to run to the intersection or the forked road and determines entry information for changing lanes according to the determined traffic volume.

13. The route guidance device of claim 12, wherein the controller measures an average speed of moving bodies moving on a link corresponding to the redirection lane and the adjacent lane in the predetermined unit and determines the traffic volume according to a result of comparing the measured average speed with a predetermined reference speed.

14. The route guidance device of claim 13, wherein the controller determines an entry spot for entering a section in which the measured average speed is faster than the reference speed.

15. The route guidance device of claim 12, wherein when the entry information indicates an entry spot for the moving body to enter, the entry information is determined according to a traffic volume of any one of the redirection lane and the adjacent lane, and when the traffic volume is large, the entry spot is determined as a spot closer than a predetermined reference position.

16. The route guidance device of claim 12, wherein when the entry information indicates an entry time for the moving body to enter, the entry information is determined according to a traffic volume of any one of the redirection lane and the adjacent lane, and when the traffic volume is large, the entry time is determined as a time earlier than a predetermined reference time.

17. The route guidance device of claim 11, wherein the redirection lane is a lane in which a moving direction is indicated by an arrow on a road and include at least one of a left turn lane, a right turn lane, a go-straight and left turn available lane, and a go-straight and right turn available lane.

18. The route guidance device of claim 11, wherein the controller controls a display unit to display the determined moving direction for a user.

19. The route guidance device of claim 11, wherein the controller generates a control signal for controlling a moving direction of the moving body according to the determined entry route.

20. A non-transitory computer-readable recording medium including a program for executing a route guidance method for performing lane change guidance in consideration of a congested lane section, the route guidance method comprising:
calculating a driving route from a current location of a moving body to a destination;
determining whether an intersection or a forked road exists at a predetermined distance from the current location of the moving body on the calculated driving route;
checking, when the intersection or the forked road exists, link information corresponding to a lane in which the moving body is located, and determining a moving direction toward the intersection or the forked road;
determining an entry route for entering the intersection or the forked road according to the determined moving direction;
wherein the determining of an entry route includes:
determining whether a lane for the moving body to run in is to be changed according to the moving direction toward the intersection or the forked road; and
if the lane for the moving body to run in is to be changed, determining a traffic flow on a redirection lane in which the moving body is to run and a lane adjacent to the redirection lane according to the moving direction,
wherein the determining the traffic flow includes:
dividing respective links corresponding to a plurality of lanes constituting a road into sections; and
determining the traffic flow by measuring a traffic volume for each of the divided link sections,
wherein the traffic flow of the divided link sections comprises a congestion section and a non-congestion section; and
determining an entry spot of the moving body according to the determined traffic flow.

\* \* \* \* \*